United States Patent Office 3,329,731
Patented July 4, 1967

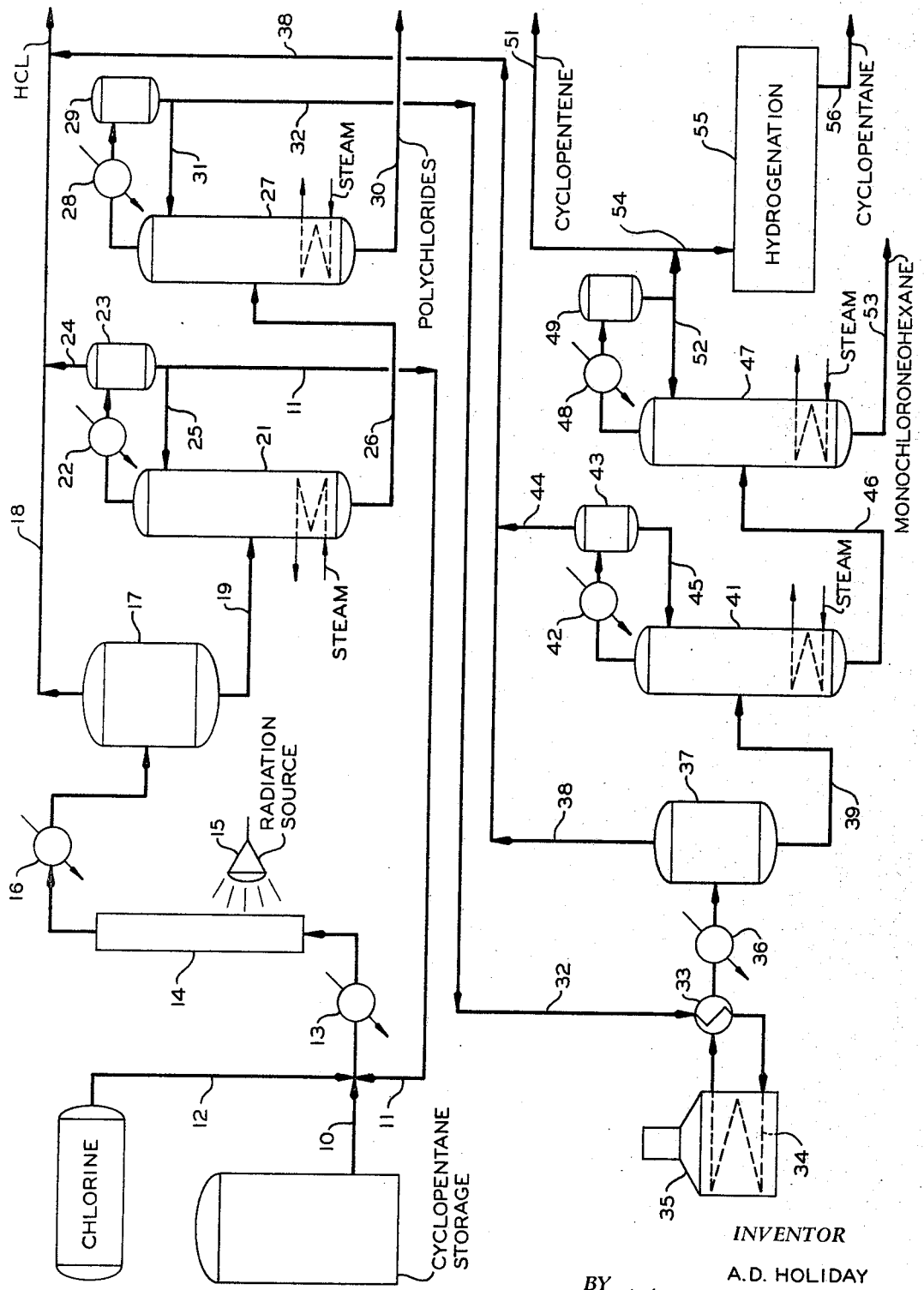

3,329,731
PRODUCTION OF PURE CYCLIC
HYDROCARBONS
Allan D. Holiday, Bartlesville, Okla., assignor to Phillips
Petroleum Company, a corporation of Delaware
Filed Mar. 22, 1965, Ser. No. 441,633
5 Claims. (Cl. 260—666)

This invention relates to the production of pure or substantially pure cyclic hydrocarbons from an impure feed stream. In one aspect this invention relates to the production of substantially pure cyclo-olefins from impure cycloparaffin feed stocks. In one of its more specific aspects the invention relates to the production of substantially pure cyclopentene and/or cyclopentane from a mixture of cyclopentane and neohexane.

Cyclopentane and cyclopentene are utilized as starting materials in organic synthesis and as solvents because of their pleasant odor and other attractive characteristics. The impurity which occurs in cyclopentane is principally neohexane (2,2-dimethylbutane) because their boiling points are less than 1° F. apart. Therefore the cost of cyclopentane increases rapidly as its purity is increased. The present cost of 99.0 mole percent cyclopentane is about $203 per 5 gallons whereas 90.0 mol percent cyclopentane costs about $10 per 5 gallons.

I have discovered that substantially pure cyclopentene can be prepared from impure cyclopentane, for example, cyclopentane containing about 10 percent neohexane as impurity. The impurity in 90 percent cyclopentane and 99 percent cyclopentane is neohexane. I have discovered that cyclopentane is photochemically halogenated at about twice the rate at which neohexane is halogenated. I have also discovered that the monochloride of neohexane, once formed, resists dehydrochlorination under the conditions favorable to dehydrochlorination of the monochloride of cyclopentane. I have found that cyclopentane can be halogenated so as to form predominantly the monohalide of cyclopentane by conducting the halogenation reaction in stages with cooling, removal of hydrogen halide and resaturation with halogen between stages so that about 10 percent of the cyclopentane is halogenated in each stage. The hydrocarbons, e.g., cyclopentane and neohexane, are then removed from the halogenated hydrocarbons and recycled to the photochemical halogenation steps along with the fresh feed. I have found that the ratio of neohexane to cyclopentane in the recycle stream increases as a result of the preferential halogenation of cyclopentane until the amount of neohexane that is halogenated is equal to the amount of neohexane in the fresh feed and then the ratio of neohexane to cyclopentane in the recycle stream remains substantially constant as long as the ratio of neohexane to cyclopentane in the fresh feed remains constant. The monohalides of cyclopentane and neohexane are separated from the polyhalides and are passed to a dehydrohalogenation step where the dehydrohalogenation is conducted under conditions of relatively high temperature, e.g., 700 to 1200° F., and a relatively short residence time, e.g., about 1 to 7 seconds, to yield substantially pure cyclopentene. The dehydrohalogenation reactor is preferably fabricated from an iron-containing alloy such as carbon steel or any of the various types of stainless steel containing at least about 50 percent iron. The cyclopentene can be hydrogenated by conventional processes to produce substantially pure cyclopentane. Cyclopentene having a purity of 99.5 weight percent has been produced from cyclopentane of 90 percent purity.

It is an object of this invention to provide a method for producing substantially pure cyclic hydrocarbons from impure cyclic hydrocarbons. Another object of the invention is to provide a method and means for purifying an impure cyclopentane stream. It is also an object of this invention to provide a method for producing substantially pure cyclopentene. Other objects and advantages of this invention will become apparent to one skilled in the art upon studying this disclosure including the detailed description of the invention and the appended drawing wherein:

The sole figure of the drawing is a schematic flow sheet of one system for carrying out the process of the invention.

Referring now to the drawing, fresh cyclopentane feed, containing neohexane as an impurity, in conduit 10 and recycle cyclopentane and neohexane in conduit 11 are admixed with chlorine supplied from conduit 12, cooled in heat exchanger 13 and chlorinated in photochemical reactor 14 by radiation from source 15. Although only one stage of chlorination is shown, it will usually be advantageous to utilize a plurality of photochemical chlorination stages with HCl removal, cooling and resaturation with chlorine between stages in order to obtain a satisfactory conversion level and a satisfactory ratio of monochloride to dichloride. Interstage cooling and removal of HCl formed with only the amount of chlorine present that will be consumed in each stage is favorable to a high ratio of monochloride to dichloride.

The effluent from reactor 14 is cooled in cooler 16 and passed to separator 17 where HCl is flashed and removed via conduit 18. The liquid phase of the reactor effluent is passed from separator 17 via conduit 19 to distillation column 21. The overhead vapors from column 21 are cooled in cooler 22 to condense cyclopentane in accumulator 23. HCl and any gases appreciably lighter than cyclopentane are removed via conduit 24. Liquid cyclopentane, containing neohexane, is recycled via conduit 11 to the feed to the photochemical reactors 14. A portion of the liquid is returned to the column 21 via conduit 25 as reflux. Cyclopentane is more readily chlorinated than is neohexane and therefore the ratio of neohexane to cyclopentane in the recycle stream in conduit 11 is increased over that of the feed stream. The ratio of neohexane to cyclopentane in the recycle stream will continue to increase until the amount of neohexane converted in the reaction is equal to the amount of neohexane in the feed and then the ratio of neohexane to cyclopentane will remain substantially constant if the amount of neohexane in the feed remains constant.

Liquid chlorinated hydrocarbons are removed from column 21 via conduit 26 and passed to distillation column 27. The overhead vapors from column 27 are cooled in cooler 28 so as to condense monochlorocyclopentane. A portion of the liquid in accumulator 29 is passed via conduit 31 to column 27 as refluxed and the remainder is passed via conduit 32 through heat exchanger 33 and coil 34 in dehydrochlorination furnace 35. The furance coil effluent is passed through heat exchanger 33, further cooled in cooler 36 and passed to liquid-gas separator 37. Free HCl generated in furnace coil 34 is removed via conduit 38. The kettle product of column 27 comprising polychlorinated hydrocarbons is removed via conduit 30.

The liquid products in separator 37 are passed via conduit 39 to distillation column 41. The overhead vapors from column 41 are cooled in cooler 42 to condense cyclopentene and lighter material comprising HCl is removed from accumulator 43 via conduit 44. Liquid from accumulator 43 is returned to column 41 via conduit 45.

The kettle product from column 41 is passed via conduit 46 to distillation column 47. Overhead vapors from column 47 are cooled in cooler 48 to condense cyclopentene in accumulator 49. Substantially pure cyclopentene is recovered via conduit 51. Liquid in accumulator 49 is returned to column 47 via conduit 52. The kettle product of column 47, comprising monochlorocyclohexane, is removed via conduit 53.

If desired, distillation column 47 can be bypassed and the kettle product of distillation column 41 passed directly through conduit 33 to the dehydrochlorination furnace 53 because the polychloride is removed via conduit 30 will not be dehydrochlorinated under conditions utilized to dehydrochlorinate monochlorocyclopentane. Thus the polychlorides of cyclopentane and neohexane (if any are formed) will be removed with the monochloroneohexane in conduit 53.

If substantially pure cyclopentene is desired as product, all or part of the cyclopentene in conduit 51 can be passed via conduit 54 to a hydrogenation step 55 and cyclopentane can be recovered via conduit 56. The hydrogenation of cyclopentene is accomplished in a conventional hydrogenation process utilizing a catalyst such as reduced nickel on kieselguhr.

The following example will be helpful in attaining an understanding of the invention; however, the example should be considered as illustrative and should not be construed to limit the invention unduly.

*Example*

A sample of grade 90 cyclopentane (minimum purity 90 mol percent cyclopentane) was chlorinated in Alcoa tubes in four stages with cooling, HCl removal and resaturation with chlorine between stages. Reaction was catalyzed with a mercury vapor lamp. The reaction product was distilled to remove HCl and unreacted cyclopentane overhead and was again distilled to remove dichlorides and heavier as a kettle product. The resulting monochlorocyclopentane product, containing some monochloroneohexane, was then thermally dehydrochlorinated in a stainless steel tube. HCl was removed from the dehydrochlorinated product and the product was distilled to produce substantially pure cyclopentene. The data obtained from the above runs are shown in the following Tables I and II.

Each product stream was analyzed by gas-liquid chromatography (GLC).

TABLE I.—PHOTOCHEMICAL CHLORINATION OF CYCLOPENTANE

| Stream | Feed Stock | First Pass | Second Pass | Third Pass | Fourth Pass |
|---|---|---|---|---|---|
| Process Conditions: | | | | | |
| Photochemical Reaction | | Cylindrical Vycor Tube | | | |
| Reactor Inlet Temp., °F. | | 130 | 100 | 130 | 130 |
| Reactor Outlet Temp., °F. | | 150 | 165 | 150 | 150 |
| Pressure, p.s.i. gage | | 40 | 40 | 40 | 40 |
| Residence Time, seconds¹ | | 21 | 20 | 21 | 21 |
| Chlorine Utilization, Percent | | 100 | 100 | 100 | 100 |
| Analytical Data, Wt. Percent: | | | | | |
| Cyclopentane | 98.3 | 83.0 | 71.4 | 66.55 | 54.73 |
| Neohexane | 0.7 | 0.51 | 0.53 | 0.45 | 0.38 |
| Monochlorocyclopentane | | 11.38 | 13.50 | 13.77 | 40.02 |
| Monochloroneohexane | | 0.04 | 0.07 | 1.35 | 0.16 |
| Dichlorocyclopentane | | 0.04 | 0.11 | 3.83 | 4.59 |
| Dichloroneohexane | | 0.01 | 0.2 | 0.77 | 0.12 |
| Total | 100.0 | 100.0 | 100.0 | 100.0 | 100.0 |
| Results: | | | | | |
| Per Pass Conversion, Wt. Percent of Total Feed | | 5.02 | 11.33 | 11.35 | 11.37 |
| Cumulative Conversion, Wt. Percent of Total Feed | | 5.02 | 11.42 | 12.53 | 46.32 |
| Monochloride, Wt. Ratio | 1.74 | 11.44 | 8.37 | 1.50 |
| Selectivity, Wt. Percent of Feed to Monochlorides | 98.53 | 95.60 | 91.33 | 88.37 |

¹ Residence time excludes pre-heater. 100% liquid phase.

TABLE II.—DEHYDROCHLORINATION OF MONOCHLOROCYCLOPENTANE

| Stream | Feed | Run 1 | Run 2 | Run 3 | Debded Product |
|---|---|---|---|---|---|
| Process Conditions: | | | | | |
| Reactor Inlet Temp., °F. | | 862 | 883 | 887 | |
| Reactor Outlet Temp., °F. | | 932 | 1,058 | 1,070 | |
| Reactor Inlet Pressure, p.s.i. gage | | 1 | 2 | 2 | |
| Reactor Outlet Pressure, p.s.i. gage | | 0 | 0 | 0 | |
| Reactor Residence Time, seconds⁴ | | 30 | 1.55 | 1.09 | |
| Analytical Data, Wt. Percent: | | | | | |
| Cyclopentane | 0.02 | | | | 0.11 |
| Neohexane | | | | | |
| Cyclopentene | | 98.27 | 99.38 | 99.41 | 99.5 |
| 3,3-dimethyl-1-butene | | 0.03 | 0.04 | 0.05 | 0.4 |
| Monochlorocyclopentane | 97.70 | 0.07 | 0.14 | 0.04 | |
| Monochloroneohexane | 2.28 | 0.56 | 4.32 | 0.44 | |
| Heavies | | 0.07 | 0.17 | 0.06 | |
| Total | 100.0 | 100.0 | 100.0 | 100.0 | |
| Results: | | | | | |
| Conversion, Wt. Percent of Monochlorocyclopentane | | 99.5 | 99.77 | 99.87 | |
| Selectivity, Wt. Percent to Cyclopentene | | 98.3 | 99.33 | 99.94 | |

¹ See heavies recovered from product of Table I.
² Reactor was Type 316 stainless steel tubing.
³ Overhead product of debutanizer of Run 43.
⁴ Calculation based on average temperature and pressure, and vapor in reactor made up of feed.

The data of the example show that substantially pure cyclopentene can be prepared from an impure charge stock of cyclopentane. It is a feature of the invention that only a small amount of by-products are formed and the cyclopentene product exceeds the specification for pure grade cyclopentene. The cyclopentene product can be hydrogenated to produce pure grade cyclopentane. Hydrogenation can be effected at a temperature in the range of 350 to 500° F. and pressure in the range of 300 to 600 p.s.i. in the presence of a hypdrogenation catalyst such as reduced nickel on kieselguhr. The conditions for hydrogenating cyclopentene include a mol ratio of hydrogen to olefin in the reactor of about 3 to 6 and a mol ratio of cyclopentane to cyclopentene in the recycle of about 3 to 6.

Although the description of the invention has been directed to purification of cyclopentane, it is applicable generally to cycloparaffins. For example, the principal impurities in cyclohexane are 2,4-dimethylpentane and methylcyclopentane. These impurities are halogenated at a slower rate than cyclohexane and resist dehydrohalogenation at conditions favorable to the dehydrohalogenation of cyclohexylchloride.

That which is claimed is:

1. A process for producing substantially pure cyclopentene from a mixture of cyclopentane and neohexane which comprises halogenating said mixture in a photochemical halogenating step so as to produce monohalocyclopentane; removing hydrogen halide; recovering and recycling unconverted cyclopentane and neohexane to said halogenating step; passing the halogenated hydrocarbon stream to a dehydrohalogenation step in a ferruginous reaction zone at a temperature in the range of about 700 to 1200° F. and a residence time in the range of about 0.5 to 10 seconds so as to dehydrohalogenate monohalocyclopentane substantially completely; removing hydrogen halide; and recovering substantially pure cyclopentene from unconverted monohalide of neohexane and polyhalides of cyclopentane and neohexane.

2. A process for producing substantially pure cyclopentene from a mixture of cyclopentane and neohexane which comprises halogenating said mixture in a photochemical halogenating step so as to produce hydrocarbon monohalides; removing hydrogen halide; recovering and recycling unconverted cylopentane and neohexane to said halogenating step; removing hydrocarbon polyhalides; passing the monohalogenated hydrocarbons to a dehydrohalogenation step in a ferruginous reaction zone at a temperature in the range of about 700 to 1200° F. and a residence time in the range of about 0.5 to 10 seconds so as to dehydrohalogenate monohalocyclopentane substantially completely; removing hydrogen halide; and recovering substantially pure cyclopentane from unconverted monohaloneohexane.

3. A process for producing substantially pure cyclopentene from a mixture of cyclopentane and neohexane which comprises chlorinating said mixture in a photochemical chlorination step so as to produce monochlorocyclopentane; removing hydrogen chloride; recovering and recycling unconverted cyclopentane and neohexane to said chlorination step; passing the chlorinated hydrocarbon stream to a dehydrochlorination step in a ferruginous reactor at a residence time in the range of about 0.5 to 10 seconds and at a temperature in the range of about 700 to 1200° F. so as to dehydrochlorinate monochlorocyclopentane substantially completely; removing hydrogen chloride; and recovering substantially pure cyclopentene from unconverted monochloride of neohexane and polychloride of neohexane and cyclopentane.

4. A process for producing substantially pure cyclopentene from a cyclopentane feed containing neohexane as an impurity which comprises chlorinating the cyclopentane feed to produce an effluent stream containing monochlorocyclopentane; dehydrochlorinating said effluent stream in a ferruginous reactor at a residence time in the range of about 0.5 to 10 seconds and a temperature in the range of about 700 to 1200° F.; and recovering substantially pure cyclopentene from the unconverted chlorine in the effluent of the dehydrochlorination reaction.

5. A process for producing substantially pure cyclopentane from cyclopentane containing neohexane as an impurity which comprises halogenating the cyclopentane feed to produce an effluent stream containing monohalocyclopentane and monohaloneohexane; dehydrohalogenating said effluent stream in a ferruginous reactor at a temperature in the range of about 700 to 1200° F. at a residence time in the range of about 0.5 to 10 seconds; recovering substantially pure cyclopentene from unconverted monohaloneohexane in the effluent of the dehydrohalogenation reaction; and hydrogenating said cyclopentene to produce substantially pure cyclopentane.

References Cited
UNITED STATES PATENTS

| | | | |
|---|---|---|---|
| 2,420,030 | 5/1947 | Brandon | 260—666 |
| 2,707,197 | 4/1955 | Souillard | 204—163 |

DELBERT E. GANTZ, *Primary Examiner.*

V. O'KEEFE, *Assistant Examiner.*